H. A. STEEN.
COMPOUND BAND BRAKE.
APPLICATION FILED OCT. 2, 1916.

1,282,483.

Patented Oct. 22, 1918.

Inventor
H. A. Steen
by
Attorney

UNITED STATES PATENT OFFICE.

HALFDAN A. STEEN, OF CHRISTIANIA, NORWAY, ASSIGNOR TO ALLIS-CHALMERS MANUFACTURING COMPANY, A CORPORATION OF DELAWARE.

COMPOUND BAND-BRAKE.

1,282,483.   Specification of Letters Patent.   Patented Oct. 22, 1918.

Original application filed October 27, 1910, Serial No. 589,435. Renewed October 27, 1916, Serial No. 129,000. Divided and this application filed October 2, 1916. Serial No. 123,791.

*To all whom it may concern:*

Be it known that I, HALFDAN A. STEEN, a subject of the King of Norway, residing at Christiania, in the country of Norway, have invented a certain new and useful Improvement in Compound Band-Brakes, of which the following is a specification.

This invention relates to brakes and particularly to band brakes.

When motors are used for driving cranes and for operating hoists, it is advantageous to provide a braking device by which the motor is promptly and automatically brought to rest upon the interruption of electric supply circuit connections, or in case of accident to mechanical parts. This result is usually accomplished by providing a spring or some similar mechanical means for applying the brake and an electro-responsive device for releasing the brake. Band brakes have been employed for these purposes but compound band brakes capable of effectively multiplying the energy of retarding forces heretofore have not been obtained.

The compound band brakes which I have provided are effective for both directions of motor rotation without sacrificing the efficiency of the brakes, and a comparatively light spring may be employed for setting or applying the band brake, thus permitting the use of a light electro-magnet for releasing the same. The present application is a division of applicant's copending application, Ser. No. 589,435, filed Oct. 27, 1910, renewed Oct. 27, 1916, Serial No. 129,000.

One of the objects of my invention is to provide a compound brake for effectively multiplying the energy of retarding forces.

Another object of my invention is to improve the construction of brakes, making them more simple and durable than those disclosed in the prior art, and at the same time possessed of all the advantages of quick and effective action.

These and other objects are attained by this invention, the various novel features of which will be apparent from the description and drawings, disclosing one embodiment of such invention, and will be particularly pointed out in the appended claims.

Figure 1:
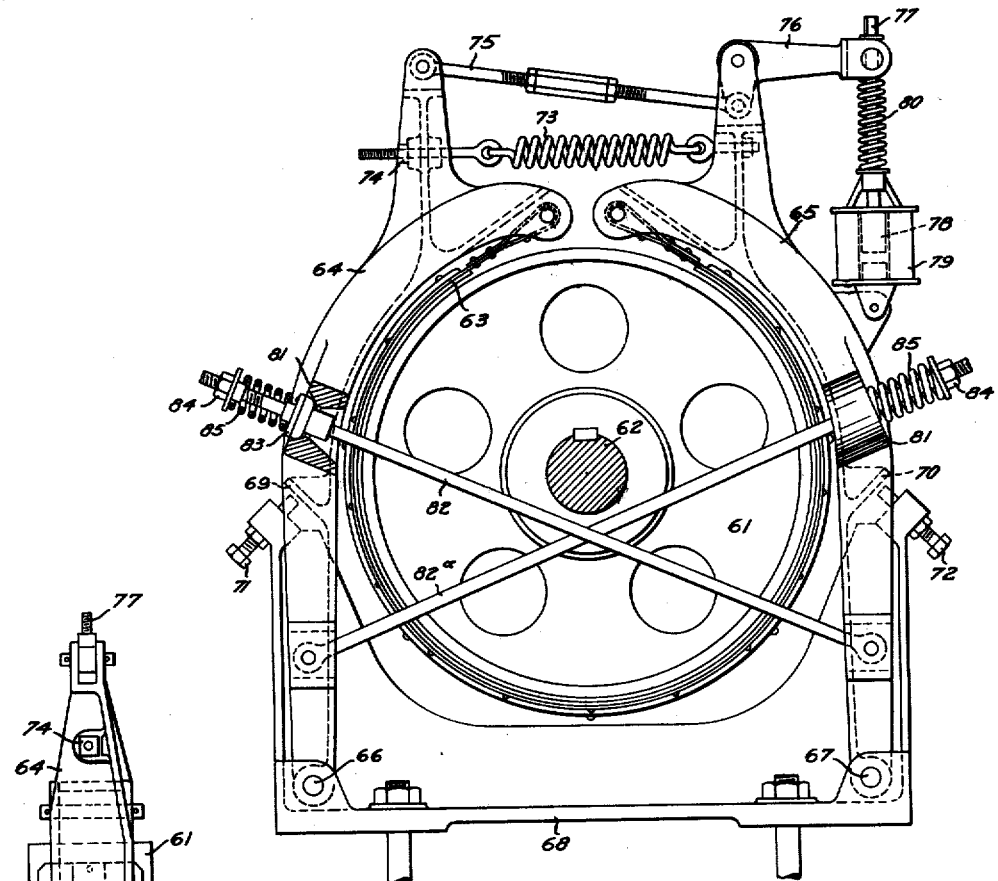
Figure 2:
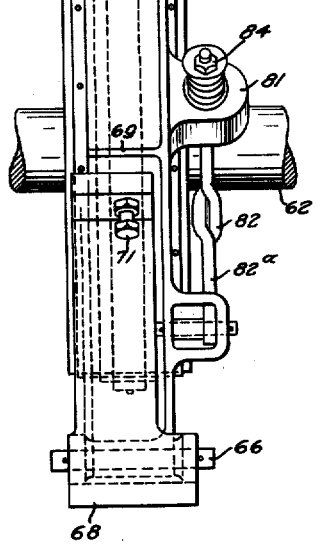

The invention is illustrated in the accompanying drawing, in which,

Figure 1 is a side elevation of a brake designed in accordance with my invention; and Fig. 2 is an end elevation of the brake shown in Fig. 1.

In accordance with the disclosure of the drawings, I use a compound brake having only one braking surface and one brake band, but I have provided an arrangement whereby the value of the retarding force originally developed is multiplied many times by an automatic action of the brake structure. The brake wheel 61 having a single braking surface, is mounted on a shaft 62 and is adapted to be engaged by a brake band 63 the ends of which are secured to the end portions of arms 64 and 65, respectively, which are pivoted at points 66 and 67, respectively, to a base 68. The brake band is preferably of the type specifically described in the above mentioned copending application. The arms 64 and 65 are provided with brackets 69 and 70, respectively, adapted to engage adjustable stops 71 and 72, respectively, on the base structure 68. The arms 64 and 65 are biased toward each other by the action of a spring 73, the effective tensional force of which may be varied by adjusting a screw 74. The arm 64 is connected, through a rod 75, crank 76, and rod 77, to the movable member 78 of the magnet 79 which, when energized, is effective to hold the arms 64, 65, separated to such an extent that the brake band 63 is free of the brake wheel. A spring 80 acts to counterbalance the weight of the movable member 78 of the magnet. The arms 64 and 65 are also provided with lugs 81 through which rods 82 and 82ª pass. The rod which passes through the lug on one arm is pivotally secured to the other arm. As indicated, the pivotal connection between a rod and the corresponding arm is nearer the pivotal mounting of said arm than is the lug on the other arm, through which said rod passes, to the pivotal mounting of the latter arm. Surrounding the rods 82 and 82ª and interposed between the loose collars 83 and nuts 84 on said rods are coil springs or resilient members 85 which are adapted to multiply the value of the retarding effort or force of this compound brake. The collars 83 are limited from sliding on the rods by stops adjacent thereto fixed to the rods. The effectiveness of the coil springs 85 as abutments for the ends of the rods, acting through the nuts 84, may be varied by adjusting the nuts 84 along the rods 82 and 82ª, either one of these nuts 84 being adjustable independently of the other.

In operation, when the electrical connections are made, as when the motor is in operation, the magnet is energized, and the brake band 63 is out of braking engagement with the brake wheel 61. When the electrical connections are broken, the magnet is deënergized. Assuming under these conditions that the motor is rotating in a counterclockwise direction, the spring 73 will draw the arms 64 and 65 closer together, forcing the brake band 63 into forceful contact with the brake wheel 61. As soon as there is any substantial gripping of the brake band on the brake wheel, the band is carried along by the wheel and the arm 64 is forced or tilted to the left compressing the coil spring 85, on that side which draws the other arm 65, by means of the rod 82, also to the left, forcing the brake band into more forceful and intimate engagement with the brake wheel and thus adding to the retarding force exerted thereon. At the point where the bracket 69 engages the stop 71 the spring 73 and adjacent spring 85 exert their maximum forces, multiplying many times the value of the original braking effort.

While applicant has considered the braking action in only one direction of rotation, the brake with its effect of multiplying the initial retarding force, is as effective for one direction of rotation of the brake wheel as the other. The reversible brake necessitates the use of only one brake wheel and brake band, depending upon the arrangement of the springs and levers for its compounding or multiplying retarding or braking effect; and the brake may have its retarding force multiplied to any degree by changing the design and dimensions of the various parts described.

There may be many modifications in the precise form and arrangement herein shown and described, and I intend in my claims to cover all such modifications which do not involve a departure from the spirit and scope of my invention.

It is claimed and desired to secure by Letters Patent:

1. In a brake of the band type for retarding a rotating body, a pivoted arm to which one end of the brake band is attached, and means associated with said arm for effecting the application of said brake, said means being operative to effect an initial retardation of said rotating body and being subsequently operative to increase the retarding effect on said rotating body by utilizing power derived from said rotating body to more tightly apply said brake.

2. In combination with a rotatable member, means coöperative with said member for retarding the latter, said means comprising a brake band, means operative to effect the application of said brake band to said member while permitting shifting of said brake band due to rotation of said member, and means operative in response to such shifting of said brake band to increase the effect of said retarding means on said member.

3. In combination with a rotatable member, a brake band coöperative with said member for retarding the same, a movable element supporting an end of said brake band, means operatively associated with said element and operative to effect the application of said brake band while permitting shifting thereof due to rotation of said member, and means operatively associated with said element and operative subsequent to the initial application of said brake band to increase the retarding effect thereof, said latter means being rendered operative through shifting of said brake band by said rotatable member.

4. In combination with a brake wheel, a brake band coöperative with said wheel for retarding the same, a plurality of movably mounted elements supporting the ends of said brake band, means operatively associated with said elements for effecting the application of said brake band to said wheel and permitting shifting thereof due to rotation of said wheel, and means operatively associated with said elements and rendered operative through shifting of said brake band by said wheel for increasing the retarding effect of said brake band subsequent to the initial application thereof.

5. In combination with a brake wheel, a brake band coöperative with said wheel for retarding the same, a plurality of elements each of which is mounted for movement about a point and supporting an end of said brake band, means operatively associated with said elements for effecting the application of said brake band and permitting shifting thereof due to rotation of said wheel, and means operative to increase the retarding effect of said brake band on said wheel beyond that capable of being exerted by said first means, said second means comprising a device connected to said movable elements at points located at different distances from the points of mounting of said elements.

6. In a brake of the band type for retarding a rotating body, a plurality of pivoted arms to which the brake band is attached, means for effecting an initial application of said brake band, and means for increasing the retarding effect of said brake band on said rotating body, said latter means comprising a connection between said arms at points located at different distances from the pivotal points of said arms.

7. In combination with a brake wheel, a plurality of angularly movable arms at all times yieldingly urged toward each other and located one at each side of the wheel, a brake band secured at its ends to said arms and coöperative with said wheel for retarding the same, stops limiting the movement of said arms, and means for exerting independently selective forces on said arms to force said band into engagement with said wheel, said means comprising a connection between points located at different distances along said arms.

8. In a brake for retarding a rotating body, a brake band adapted to coöperate with the rotating body to retard the same when rotating in either direction, and means for applying said brake band and operative to secure a retarding effect for one direction of rotation that is different from that secured for the other direction of rotation.

9. In combination with a brake wheel, a brake band coöperative with said wheel for retarding the same, a plurality of pivoted arms to which the ends of said brake band are attached, and means for moving said arms in opposite directions for effecting the application of said brake band, said arms being subsequently movable in the same direction for effecting the further application of said brake band.

10. In combination with a brake wheel, a brake band coöperative with said wheel for retarding the same, a plurality of pivoted arms to which said brake band is attached, means for effecting the initial application of said brake band, said means being attached to said arms at points located at approximately the same distance from the pivotal points of said arms, and means for increasing the retarding effect of said brake band on said wheel, said means comprising a connection between said arms at points located at different distances from the pivotal points of the arms.

11. In combination, a rotatable member, a brake band, coöperative with said rotatable member for retarding the same, means for effecting the application of said brake band to exert a retarding effect on said member, and means associated with and rendered operative through said first mentioned means subsequent to the exertion of an initial retarding effect on said rotatable member for creating a total retarding effect on said member greater than that capable of being exerted through said first mentioned means alone, said second means comprising means for causing relative movement between the ends of said brake band on shifting of the latter by the rotating member.

12. In combination with a brake wheel, a support mounted adjacent said wheel, an arm pivoted to said support, a brake band secured at one end to said pivoted arm and disposed between said brake wheel and a portion of said arm, and means for applying said brake band to said wheel for braking purposes, said means being operatively connected to said arm on the same side of the pivotal point thereof as the point of attachment of said brake band thereto, and auxiliary means operative subsequent to the initial application of said brake band by said first mentioned means for increasing the power with which the brake band is applied.

13. In a brake, the combination of a support, a plurality of arms pivoted to said support, a brake band attached at its ends to said pivoted arms, means for actuating said brake band to applied position, said means being operatively connected to each of said arms on the same side of the pivotal point thereof as the point of attachment of said brake band thereto, and auxiliary means operative subsequent to the initial application of said brake band by said first mentioned means for increasing the power with which said brake band is applied.

14. In combination with a brake wheel, a brake band coöperative with said wheel for retarding the same, a plurality of pivoted arms for supporting the ends of said brake band, means operatively associated with said band, means for effecting the initial application of arms for effecting the initial application of said brake band, and means associated with said arms and operative to constitute a resilient abutment restraining movement of one or the other of said arms depending on the direction of rotation of said wheel and to move the other arm in a direction to increase the retarding effect of said brake band on said wheel, said latter means being operative to accomplish its normal function subsequent to the initial application of said brake band.

15. In combination with a brake wheel, a support, a plurality of elements mounted on said support and capable of movement about their points of mounting, the points of mounting of said elements being at one side of a plane of the axis of said brake wheel and the elements being capable of extending about a portion of said wheel to the opposite side of said plane, a brake band secured at its ends to portions of said elements at the latter side of said plane and disposed between said elements and said wheel, resilient means operatively connected to each of said elements on the same side of the point of mounting thereof as the point of attachment of said brake band thereto for urging said band into engagement with said brake wheel, and auxiliary means operative subsequent to the initial application of said brake band by said first mentioned means for increasing the power with which said brake band is applied.

16. In combination with a brake wheel, a support mounted adjacent said brake wheel, an element mounted on said support and movable about its point of mounting, a brake of the band type secured adjacent one end to said element and disposed between said brake wheel and a portion of said element, means for applying said brake to said wheel for braking purposes, said means being operatively connected to said element on the same side of the point of mounting thereof as the point of attachment of said brake thereto, and auxiliary means associated with said movably mounted element and operative subsequent to the initial application of said brake by said first mentioned means for increasing the power with which said brake is applied.

17. In combination with a brake wheel, a brake coöperative with said wheel for retarding the same, a plurality of angularly movable arms supporting said brake, and means for moving said arms in opposite directions to produce an initial braking effect of said brake on said wheel, said arms being also movable in the same direction to produce an additional braking effect on said brake on said wheel.

18. In combination with a rotatable member, a retarding device including a brake band, a movable member connected to an end of said retarding device, a second movable member connected to another end of said retarding device and means capable of resiliently restraining the movement of one of said movable members more than the other.

19. In combination with a rotatable member, a retarding device including a brake band coöperating with said rotatable member, a movable member connected with an end of said retarding device, adjustable resilient means for restraining the movement of said movable member, a second movable member connected with another end of said retarding device, and a second adjustable resilient means for restraining the movement of said second movable member.

20. In combination with a rotatable member, a retarding device including a brake band, a movable member connected to an end of said retarding device, a second movable member connected to another end of said retarding device, means capable of resiliently restraining the movement of one of said movable members more than the other and an adjustable stop for at least one of said movable members.

In testimony whereof, the signature of the inventor is affixed hereto.

HALFDAN A. STEEN.

Witnesses:
C. FABRICIUS HANSEN,
KARL L. LEE.

It is hereby certified that in Letters Patent No. 1,282,483, granted October 22, 1918, upon the application of Halfdan A. Steen, of Christiania, Norway, for an improvement in "Compound Band-Brakes," errors appear in the printed specification requiring correction as follows: Page 2, line 22, after the reference-numeral "85" strike out the comma; same page and line, after the word "side" insert a comma; page 4, line 25, claim 17, for the word "on" read *of;* and that the said Letters Patent should be read with these corrections therein that the same may conform to the record of the case in the Patent Office.

Signed and sealed this 21st day of January, A. D., 1919.

[SEAL.]

F. W. H. CLAY,

*Acting Commissioner of Patents.*

Cl. 74—37.